United States Patent [19]

Kavaliunas

[11] Patent Number: 5,159,072
[45] Date of Patent: Oct. 27, 1992

[54] DICHLOROMETHANE ABATEMENT

[75] Inventor: Arunas V. Kavaliunas, Rochester, N.Y.

[73] Assignee: Eastman Kodak Company, Rochester, N.Y.

[21] Appl. No.: 593,844

[22] Filed: Oct. 5, 1990

[51] Int. Cl.$^5$ .................. C07D 413/00; C07C 333/00
[52] U.S. Cl. ..................................... 544/111; 558/235
[58] Field of Search ................. 558/237, 235; 544/80, 544/122, 111

[56] References Cited

U.S. PATENT DOCUMENTS 1,726,647 9/1929 Cadwell .............................. 558/237

Primary Examiner—Mary C. Lee
Assistant Examiner—Robert C. Whittenbaugh
Attorney, Agent, or Firm—Robert A. Gerlach

[57] ABSTRACT

A method of heating dichloromethane laden streams to prevent discharge into the environment by contacting the laden stream with N,N-dialkyldithiocarbamate salt in the presence of oxygen and water.

13 Claims, No Drawings

DICHLOROMETHANE ABATEMENT

BACKGROUND OF THE INVENTION

1. Field of the Invention

This invention relates to a method of treating dichloromethane containing streams of material in order to prevent the dichloromethane from entering the environment and more particularly to a method of converting the dichloromethane into a material that is more readily handled by disposal technique.

Dichloromethane is one of the more common laboratory and industrial solvents particularly useful because of its cost, non-flammability and low boiling point. Major users of dichloromethane recycle it, however, inevitably, some of it is lost to the environment.

2. Description of Related Art

Holah and co-workers in an article entitled "Reactions of sodium N,N-diethyldithiocarbamate with some organic solvents" published in the *Canadian Journal of Chemistry*, Vol. 48, 1970, reported a reaction between dichloromethane and anhydrous sodium N,N-diethyldithiocarbamate. This reaction was carried out under strictly anhydrous and oxygen free conditions. For this reason, the reaction as disclosed is not suitable to effectively remove dichloromethane from streams in which it is sued as a solvent.

SUMMARY OF THE INVENTION

The invention provides a method of treating dichloromethane laden effluent streams to effectively prevent is discharge to the environment by contacting the dichloromethane laden stream with an N,N-dialkyldithiocarbamate salt in the presence of oxygen and water.

DESCRIPTION OF THE PREFERRED EMBODIMENTS

The invention contemplates the destruction of dichloromethane by reaction with a salt of N,N-dialkyldithiocarbamate wherein the dithiocarbamate reactant is preferably formed in situ by mixing a water solution of an alkali metal hydroxide or an alkaline earth metal hydroxide, or an alkaline earth metal oxide, with an aliphatic alcohol or an alkylene glycol and a dialkylamine in a first step and adding to the product of the first step carbon disulfide to form the salt of N,N-dialkyldithiocarbamate and subjecting a stream laden with dichloromethane to this reaction product to form the alkali metal chloride or alkaline earth metal chloride and methylenebis (N,N-dialkyldithiocarbamate), the solid reaction product can then be separated to recover the salt and the solid organic reaction product may be discarded in accordance with suitable environmental techniques or employed as an intermediate in the preparation of useful products. Preferably, the carbon disulfide should be added at a temperature less than about 60° C. to prevent auto-ignition of the carbon disulfide.

In the practice of this invention the dichloromethane laden stream may be contacted with the salt of N,N-dialkyldithiocarbamate in any suitable fashion, which may be a batch type system, such as, a suitable reactor or a continuous type system, such as, for example, conventional scrubbers used in the chemical industry, fluidized beds, both stationary beds and rotating beds; countercurrent injection of the two materials into each other and the like. Intimate contact with the dichloromethane is preferred.

Any suitable alkali metal hydroxide, alkaline earth metal hydroxide or alkaline earth metal oxide may be employed in order to form the salt in accordance with this invention such as, for example, sodium hydroxide, potassium hydroxide, calcium oxide, calcium hydroxide, lithium hydroxide, rubidium hydroxide, strontium oxide, and the like. Sodium and potassium hydroxide are preferred.

The hydroxide or oxide is mixed with a suitable solvent that may be an aliphatic alcohol such as, for example, ethanol, propanol, butanol, and the like, or an alkylene glycol such as, for example, ethylene glycol, 1,2 propanediol, 1,3 propanediol, 1,4 butandiol, diethylene glycol, triethylene glycol, tetraethylene glycol and the like. When an hydroxide is employed, it is preferred that it first be dissolved in water as this increases the rate of the reaction.

A dialkylamine is then added to this solution. Any suitable dialkylamine can be used such as, for example, diethylamine, dipropylamine, diisopropylamine, dibutylamine, diisobutylamine, cyclic amines where the alkyl groups connected to the nitrogen atom are joined together through either another amino group or a hetero-atom such as oxygen including for example, piperazine, morpholine and the like. Finally, carbon disulfide is added to form the salt of N,N-dialkyldithiocarbamate which is used directly to treat the $CH_2Cl_2$.

The various reactants mentioned above are employed in sufficient quantities to prepare an excess of the salts of N,N-dialkyldithiocarbamates to react with all dichloromethane in the laden stream in order to prevent its entry into the environment. A wide latitude can be employed in the quantity of each of the ingredients employed int he preparation of the salt of N,N-dialkyldithiocarbamate, i.e., the dialkylamine, the alkali metal hydroxide, alkaline earth metal hydroxide or oxide and carbon disulfide; however, it is preferred to employ stoichiometric amounts.

The invention will be further illustrated by the following examples:

EXAMPLE 1

A warm solution of 8.2 grams of sodium hydroxide in 10 ml of water was added to 75 ml of diethylene glycol, the solution being stirred by means of a magnetic stirring bar. A white precipitate formed immediately and the temperature of the reaction mass increased. Within a few minutes the precipitate dissolved and 20.5 ml of diethylamine was added. About 12 ml of carbon disulfide was slowly and intermittently added and the temperature was prevented from exceeding 60° C. A clear pale yellow solution resulted which solution was permitted to cool to approximately 55° C. 13 ml of dichloromethane was added to this reaction mass without the addition of heat and the temperature slowly increased to 70° C. A solid appeared in the solution and the mixture was allowed to cool to room temperature and then poured into 1.2 liters of water and stirred for about 10 minutes. The solid precipitate was collected by filtration, washed with water and dried under gentle heat. 26.2 grams of pale yellow crystals of methylene bis(N,N-diethyldithiocarbamate) representing a yield of 84% was recurred by recrystallization from dichloromethane. The presence of this product is established by NMR and Mass spectroscopy.

EXAMPLE 2

15.5 ml of diethylamine was added to a stirred suspension of 4.3 grams of calcium oxide in 70 ml of diethylene glycol followed by the slow and intermittent addition of 9 ml of carbon disulfide. A warm yellow slurry ladened with tiny crystals formed. 10 ml of dichloromethane were slowly added to this yellow slurry at a temperature of 60° C., and this temperature was maintained for 30 minutes. The cooled light brown mixture was added to 1.5 liters of water and the product collected, washed with water and dried under gentle heat. Recrystallization from dichloromethane yielded 17.9 grams, representing a yield of 77% of methylene bis(N,N-diethyldithiocarbamate). The presence of this product is established by NMR and Mass spectroscopy.

EXAMPLE 3

The procedure of Example 1 is repeated with the exception that 33 ml of diisopropylamine are employed in place of the diethylamine of Example 1. Colorless crystals of methylene bis(N,N-diisopropyldithiocarbamate) having a melting point of 140° to 141° C. and identified by NMR were recrystallized from dichloromethane.

EXAMPLE 4

The procedure of Example 1 is again repeated with the exception that 38 ml of di-N-butylamine are employed in place of the diethylamine of Example 1. Methylene bis(N,N-di-N-butyldithiocarbamate) identified by NMR in the form of a yellow oil was obtained.

EXAMPLE 5

Example 2 was repeated with the exception that 13.8 ml of morpholine were employed in place of the diethylamine of Example 2. Colorless needles of methylene bis(morpholyldithiocarbamate) identified by NMR and mass spectroscopy having a melting point of 216° to 221° C. were obtained by recrystallization from dichloromethane.

The examples clearly demonstrate that the reaction between dichloromethane and an alkali metal salt or akaline earth metal salts of dialkyldithiocarbamate in normal environment to yield the metal chloride and methlyene bis(dialkyldithiocarbamate) is an effective procedure for dstroying dichloromethane and thus preventing its entry into the environment without taking any precautions against the presence of air or moisture. The reaction with dichloromethane in aliphatic alcohols or alkylene as glycols are mildly exothermic and high yields of conversion products are obtained.

What is claimed is:

1. A method of treating dichloromethane in the presence of water and oxygen to prevent its discharge to the environment comprising contacting dichloromethane with an N,N-dialkyldithiocarbamate salt and recovering the formed solid methylenebis-dialkyldithiocarbamate.

2. The method of claim 1 wherein the dichloromethane is contacted with N,N-dialkyldithiocarbamate salt in an aliphatic alcohol or a glycol.

3. The method of claim 2 wherein the glycol is ethylene glycol or an ethylene ether glycol having from 1 to 4 ethylene moieties.

4. The method of claim 3 wherein the glycol is ethylene glycol.

5. The method of claim 3 wherein the glycol is an ethylene ether glycol.

6. A method of treating dichloromethane according to claim 1 wherein the N,N-dialkyldithiocarbamate salts are formed in situ by adding carbon disulfide to a mixture of a dialkylamine or a cyclic amine, an alkali metal hydroxide, alkaline earth metal hydroxide or an alkaline earth metal oxide; in an aliphatic alcohol or a glycol.

7. The method of claim 6 wherein a dichloromethane laden effluent stream is intimately contacted with the N,N-dialkyldithiocarbamate salt.

8. The method of claim 6 wherein the carbon disulfide, dialkylamine or a cyclic amide and the alkali metal hydroxide, alkaline earth metal hydroxide or alkaline earth metal oxide is employed in stoichiometric amounts.

9. The method of claim 6 wherein the alkali metal hydroxide is sodium or potassium hydroxide.

10. The method of claim 6 wherein the dialkylamine is diethylamine.

11. The method of claim 6 wherein the dialkylamine is diisopropylamine.

12. The method of claim 6 wherein the dialkylamine is di-N-butylamine.

13. The method of claim 6 wherein the cyclic amine is morpholine.

* * * * *